United States Patent
Qi et al.

(10) Patent No.: US 7,049,014 B1
(45) Date of Patent: May 23, 2006

(54) DIRECT SECONDARY ALCOHOL FUEL CELLS

(75) Inventors: Zhigang Qi, North Arlington, NJ (US); Mark Hollett, Parsippany, NJ (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 333 days.

(21) Appl. No.: 10/091,624

(22) Filed: Mar. 5, 2002

(51) Int. Cl.
*H01M 8/00* (2006.01)
*H01M 8/10* (2006.01)

(52) U.S. Cl. .......................................... 429/12; 429/30
(58) Field of Classification Search ................ 429/12, 429/17, 19, 30
See application file for complete search history.

(56) References Cited

U.S. PATENT DOCUMENTS

| | | | |
|---|---|---|---|
| 3,013,908 A | 12/1961 | Luck et al. | |
| 3,113,049 A | 12/1963 | Worsham | |
| 4,262,063 A | 4/1981 | Kudo et al. | |
| 4,390,603 A | 6/1983 | Kawana et al. | |
| 4,478,917 A | 10/1984 | Fujita et al. | |
| 5,599,638 A | 2/1997 | Surampudi et al. | |
| 5,672,438 A | 9/1997 | Banerjee et al. | |
| 5,904,740 A | 5/1999 | Davis | |
| 6,248,460 B1 | 6/2001 | Surampudi et al. | |
| 6,383,670 B1 * | 5/2002 | Edlund et al. | 429/20 |
| 6,492,047 B1 * | 12/2002 | Peled et al. | 429/30 |
| 2003/0022033 A1 * | 1/2003 | Stimming et al. | 429/12 |
| 2004/0001979 A1 * | 1/2004 | Qi et al. | 429/12 |

FOREIGN PATENT DOCUMENTS

JP       2001-068138    *    3/2001

OTHER PUBLICATIONS

Fedkiw, P., et al., "Pulsed-Potential Oxidation of Methanol," Journal of the Electrochemical Society vol. 135, No. 10, pp. 2459-2465, Oct. 1988.*

Bianchi, G., et al., "Anodic oxidation of propane and C3 compounds in acid solution on the platinum electrode," Chimica e I'Industria 46 (5), 1964, 501-8 (abstract only).*

* cited by examiner

*Primary Examiner*—Jonathan Crepeau
(74) *Attorney, Agent, or Firm*—Mark Levy & Associates; David L. Banner

(57) ABSTRACT

A fuel cell using a secondary alcohol such as 2-propanol as fuel is disclosed. The fuel is oxidized directly at the anode without any reforming. Such a direct secondary alcohol fuel cell (D2AFC) possesses a much higher performance than a direct methanol fuel cell, especially at current densities less than 200 mA/cm$^2$. In addition, fuel loss due to crossover in a direct 2-propanol fuel cell (D2PFC) is less than one-sixth of that in a direct methanol fuel cell (DMFC).

10 Claims, 19 Drawing Sheets

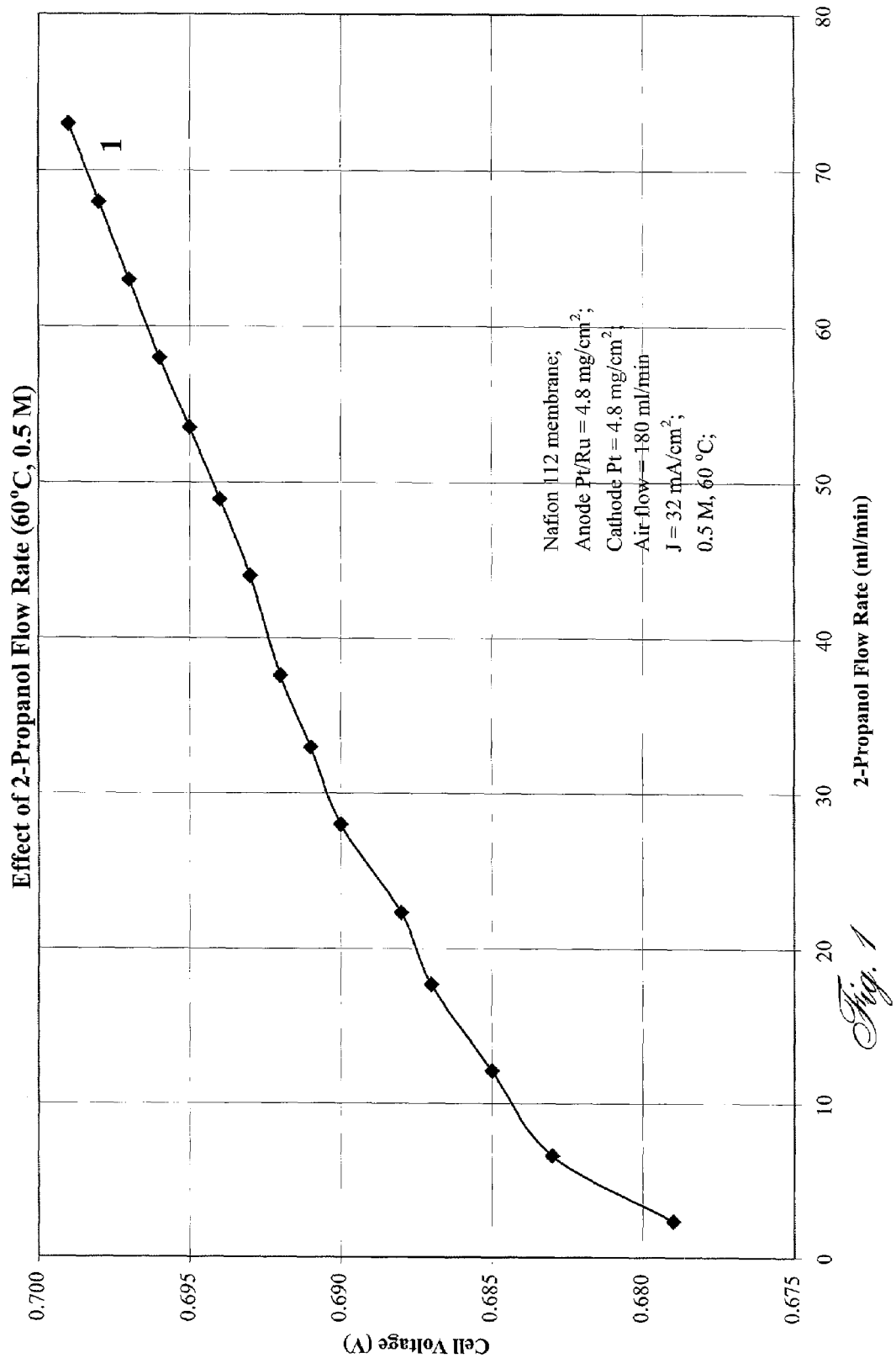

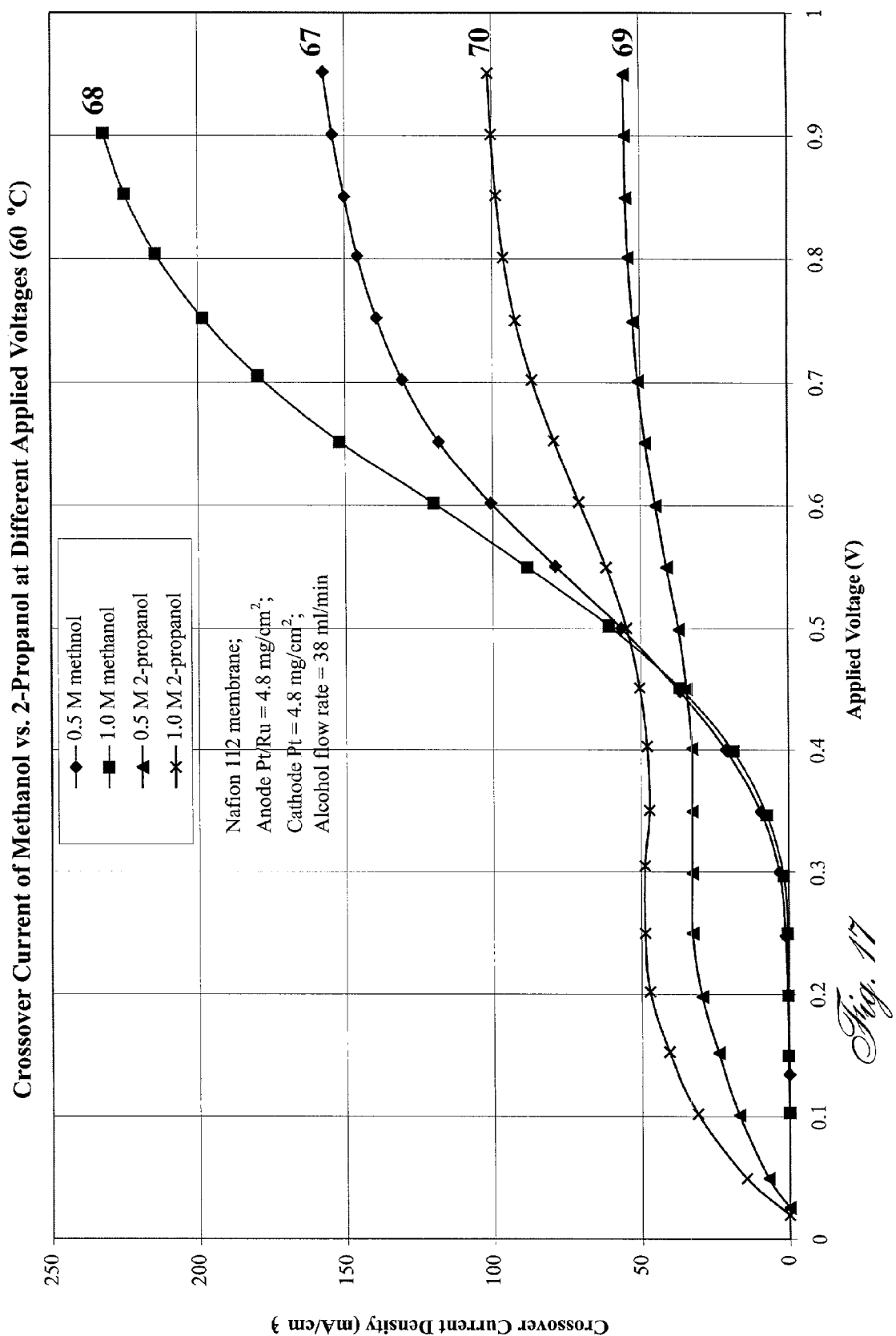

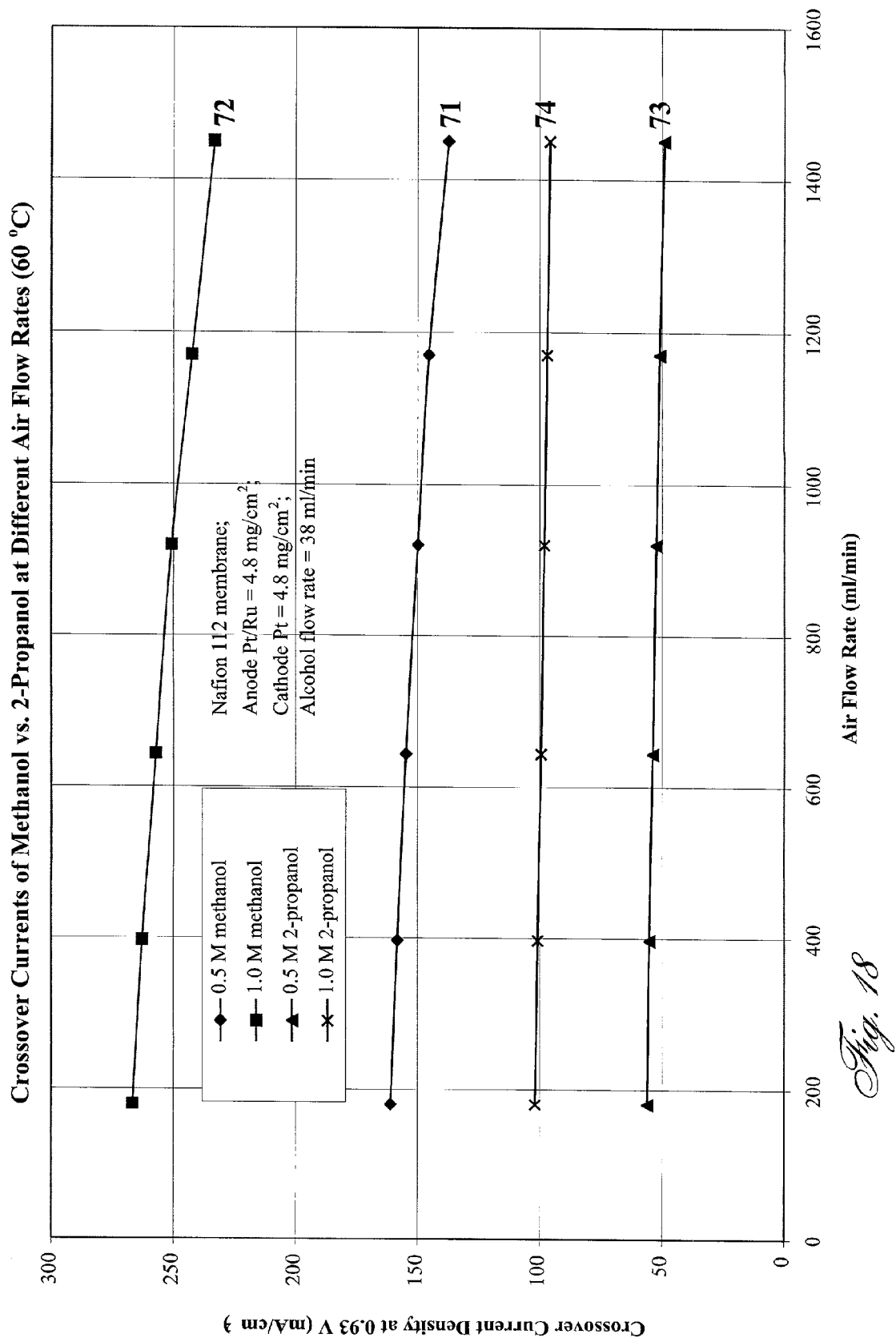

DIRECT SECONDARY ALCOHOL FUEL CELLS

FIELD OF THE INVENTION

This invention relates to direct oxidation fuel cells, and particularly to a secondary alcohol fuel cell used in a direct oxidation fuel cell using 2-propanol as its fuel.

BACKGROUND OF THE INVENTION

Hydrogen is the cleanest and most efficient fuel used in fuel cells. It is widely used in low temperature fuel cells like proton exchange membrane (PEM) fuel cells, alkaline fuel cells and phosphoric acid fuel cells, because its oxidation rate at the anode is high, even at room temperature. However, producing pure hydrogen is not a trivial task. Hydrogen is normally produced through reforming hydrocarbon fuels, such as methane, propane, and methanol. This not only makes the entire fuel cell system more complicated, it also dramatically increases the cost. Moreover, any carbon monoxide (CO) remaining in the reformed gas, even at ppm levels, will poison the electrodes of a PEM fuel cell and reduce its performance. In addition, transporting and storing hydrogen is very difficult, presenting a safety hazard.

The problems associated with hydrogen have encouraged scientists to look for other fuels that can be directly oxidized without requiring a reforming step. Methanol, the simplest alcohol containing only one carbon atom, is the most popular and widely used fuel in this regard. A direct oxidation fuel cell using methanol as the fuel is called a direct methanol fuel cell (DMFC).

In U.S. Pat. Nos. 3,013,908 and 3,113,049, a DMFC is described. Liquid feed direct methanol fuel cells have been in use from the early 1960s. These early DMFCs used liquid electrolyte like a dilute sulfuric acid for proton transportation. Major problems were encountered using the sulfuric acid electrolyte, such as corrosion of cell materials, poisoning of the electrodes by the adsorption of sulfate anions, and leakage of the electrolyte through the surrounding materials. For example, the electrolyte could gradually leak out through the pores of the air cathode, also causing fuel loss and cathode poisoning.

In order to alleviate leakage, a solid proton exchange membrane was interposed between the anode and cathode. Nafion® perfluorinated polymer, made by E. I. DuPont, was used in U.S. Pat. Nos. 4,262,063 and 4,390,603.

U.S. Pat. No. 4,478,917 used a membrane comprising styrene-divinylbenzene co-polymers with sulphonate groups.

In recent years, the use of liquid electrolyte has not been frequent in a DMFC. U.S. Pat. No. 5,599,638 was granted to Surampudi et al for just using a proton exchange membrane like Nafion as the electrolyte. Nafion membranes have excellent chemical, mechanical, thermal, and electrochemical stability and their ionic conductivity can reach as high as 0.1 S/cm. The kinetics of methanol oxidation and oxygen reduction at the electrode/membrane/electrode interfaces has been found to be more facile than at the electrode/sulfuric acid/electrode interfaces. Corrosion of cell materials becomes less severe since the fuel and water solution is free from sulfuric acid. The Nafion cell can be operated at temperatures as high as 120° C., while a sulfuric acid cell tends to degrade at temperatures higher than 80° C. Also, the absence of conducting ions in the fuel and water solution substantially eliminates the parasitic shunt currents in a multi-cell stack. Such a fuel cell is illustrated in U.S. Pat. No. 6,248,460, a continuation of U.S. Pat. No. 5,599,638, granted to Surampudi et al.

In U.S. Pat. No. 5,904,740, granted to Davis, a fuel cell with formic acid added into the methanol and water solution for the conduction of protons within the anode structure is shown. The formic acid is claimed to improve ionic conductivity and to be a clean burning fuel that does not poison the catalysts.

Unfortunately, methanol poses the serious problem of penetrating and crossing through Nafion membranes as well as other types of proton exchange membranes, via physical diffusion and electro-osmotic proton drag. Such crossover not only results in a large waste of fuel, it also greatly lowers cathode performance. Most of the methanol crossover will be electrochemically and chemically oxidized at the cathode. These oxidation reactions not only lower the cathode potential, they also consume some oxygen. Should the reaction intermediate comprise carbon monoxide, it can be adsorbed onto the catalyst surface, thus poisoning the cathode. This will further lower the performance of the fuel cell.

In U.S. Pat. No. 5,672,438, a thin layer of polymer having a higher ratio of backbone carbon atoms to those of the cationic exchange side chain is illustrated. This polymer reduces the methanol crossover rate, although the membrane resistance increases. It was suggested that the polymer with higher carbon atom ratios be preferably orientated on the anode side. Prakash et al described a polymer membrane composed of polystyrene sulfonic acid (PSSA) and poly (vinylidene fluoride) (PVDF), in WO 98/22989. The PSSA-PVDF membrane exhibited lower methanol crossover, translating into higher fuel and fuel cell efficiencies. Pickup et al suggested a modified ion exchange membrane possessing lower methanol crossover, in WO 01/93361A2. Existing membranes comprising Nafion were modified in situ by polymerizing monomers, such as aryls, heteroaryls, substituted aryls, substituted heteroaryls, or combinations thereof. The modified membrane exhibited reduced permeability to methanol crossover, often without a significant increase in ionic resistance.

Another barrier to the commercialization of DMFCs is the sluggishness of the methanol oxidation reaction. Moreover, some intermediates from methanol oxidation, like carbon monoxide, can strongly adsorb to the surface of catalysts, poisoning them, as aforementioned. Platinum alloys such as Pt/Ru have a much higher CO-tolerance, so they are widely used as the anode catalyst. Other short chain organic chemicals like formic acid, formaldehyde, ethanol, 1-propanol, 1-butanol, dimethoxymethane, trimethoxymethane, and trioxane have been suggested as fuels in direct oxidation fuel cells. U.S. Pat. No. 5,599,638 describes experimental results of using dimethoxymethane, trimethoxymethane, and trioxane in fuel cells. It was claimed that dimethoxymethane, trimethoxymethane, and trioxane could be oxidized at lower potentials than methanol, and thus would be better fuels than methanol. It was also claimed that only methanol was found to be the intermediate product from the oxidation of these fuels, thus there was no concern (i.e., methanol is ultimately oxidized to carbon dioxide and water). Using Nafion 117® as the membrane and oxygen as the oxidant, with a pressure of 20 psig, cell voltages of 0.25 V, 0.50 V, and 0.33 V were achieved at a current density of 50 mA/cm$^2$, when dimethoxymethane, trimethoxymethane, and trioxane were used at cell temperatures of 37° C., 65° C., and 60° C., respectively. However, these performances are very low and would not provide a commercial fuel cell.

The present invention provides a direct oxidation fuel cell performing much better than DMFCs, using secondary alcohol as the fuel.

It is an object of this invention to provide a fuel cell using secondary alcohols as the fuel.

It is another object of the invention to provide a fuel cell using 2-propanol as the fuel.

It is yet another object of this invention to provide a fuel cell whose fuel crossover is much less than a DMFC using methanol.

SUMMARY OF THE INVENTION

A secondary alcohol, isopropanol (2-propanol), is used as fuel in a direct oxidation fuel cell. Such a fuel cell shows much higher performance than a direct methanol fuel cell and other currently reported direct oxidation fuel cells. The isopropanol crossing through a membrane is less than one-sixth that of methanol, so a direct 2-propanol fuel cell (D2 PFC) can have much higher fuel and fuel cell efficiencies. Other secondary alcohols that could be used are glycerols, propylene glycol ($CH_3CHOHCH_2OH$), propylene glycol ($CH_3CHOHCH_2OH$), glyceraldehyde ($CH_2OHCHOHCOH$), ethylene glycol ($CH_2OHCH_2OH$), short chain alkanones such as propanone ($CH_3COCH_3$), butanone ($CH_3CH_2COCH_3$), and pentanone ($CH_3COCH_2CH_2CH_3$, $CH_3CH_2COCH_2CH_3$). The direct oxidation fuel cell is selected from a group of fuel cells consisting of a liquid electrolyte fuel cell, a solid membrane fuel cell, an alkaline fuel cell, a phosphoric acid fuel cell, a molten carbonate fuel cell, and a solid oxide fuel cell. The membrane includes a membrane element selected from a group consisting of non-fluorinated, partially fluorinated, and perfluorinated membranes.

BRIEF DESCRIPTION OF THE DRAWINGS

A complete understanding of the present invention may be obtained by reference to the accompanying drawings when considered in conjunction with the subsequent detailed description, in which:

FIGS. 1 and 1a, respectively, show a graphical view of the effect of 2-propanol flow rate on fuel cell performance at a cell temperature of 60° C. and a schematic of a typical fuel cell comprising a stack of electrodes and membranes;

FIG. 17 depicts a graph of the crossover current of methanol vs. 2-propanol at different applied voltages at a cell temperature of 60° C.; and FIG. 18 shows a graph of the crossover current of methanol vs. 2-propanol at an applied voltage of 0.93 V. at a cell temperature of 60° C.

PREFERRED EMBODIMENT OF THE INVENTION

Generally speaking, the invention features a fuel cell using a secondary alcohol as fuel. Isopropanol (2-propanol) was used as fuel in a direct oxidation fuel cell resulting in much higher performance than a direct oxidation methanol fuel cell.

Test Apparatus and Experiments

Tests were conducted using a 25 $cm^2$ fuel cell test fixture. Pt/Ru and Pt blacks were used as the anode and cathode catalysts and were applied to plain and Teflon®-treated 9-mil Toray paper, respectively to achieve a Pt/Ru and Pt loading of 4.8 mg/$cm^2$, respectively. These electrodes were hot-pressed onto Nafion 112 membrane to form a membrane-electrode assembly.

Alcohols were mixed with water before they were pumped into the cell by a micro-pump. The mixture was then re-circulated back to the mixing tank. The flow rates were controlled by a DC power supply. A condenser was used to condense the alcohol in the vapor phase and to allow the release of gaseous $CO_2$. The temperature of the mixing tank was controlled by a hot plate. The connection between the mixing tank and the cell was heated by heating tapes when needed. The temperatures of the mixing tank, alcohol mixture inlet and outlet, and air outlet were monitored by thermocouples. Air rather than oxygen was supplied to the cell by a compressor, and its flow rate was adjusted using a flow meter. Air was used at ambient temperature and pressure.

Figure 1A:
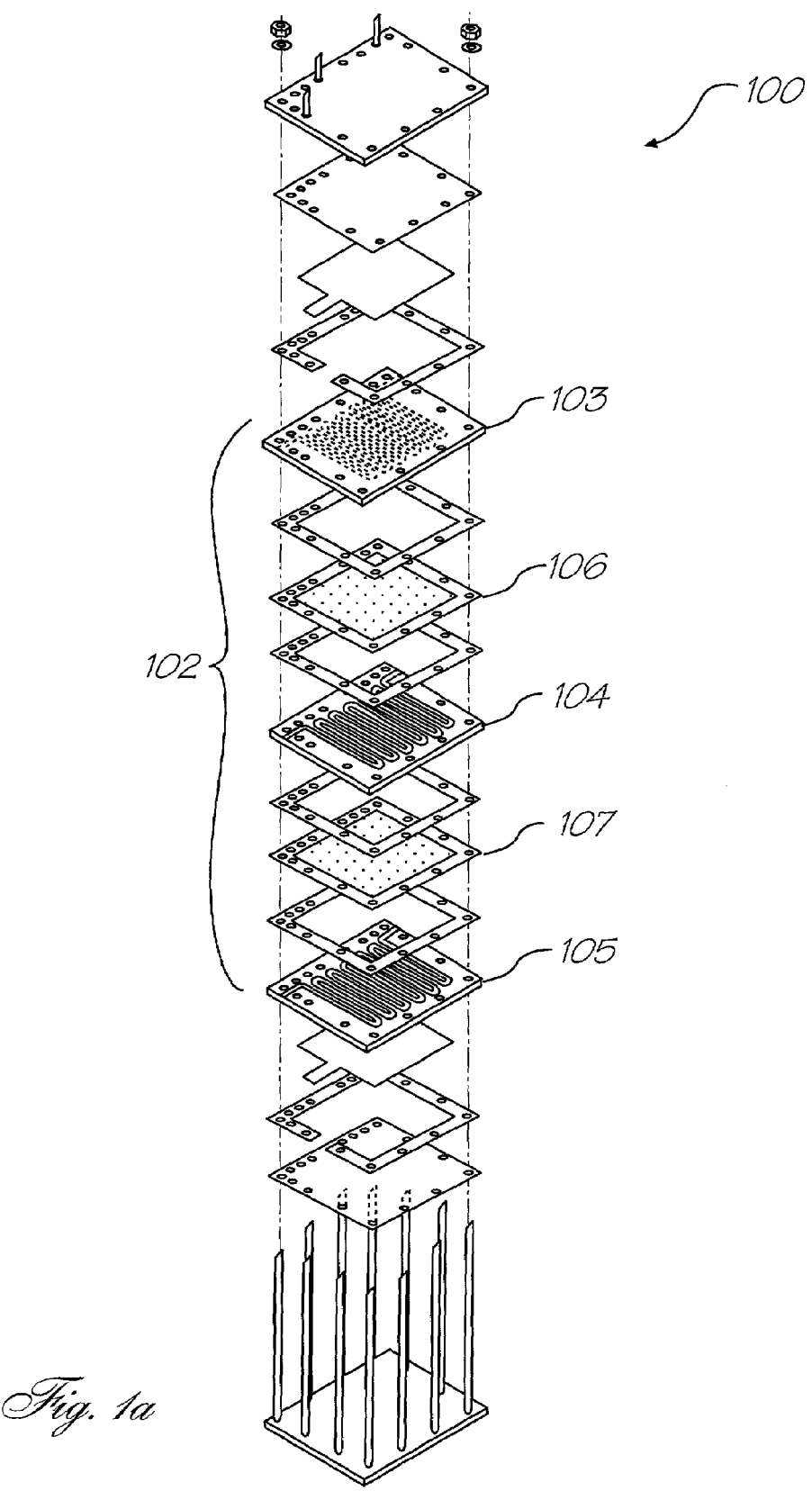

Now referring to FIG. 1, a graph shows that 2-propanol flow rate has a slight effect on the fuel cell performance at a cell temperature of 60° C., using a 0.5 M 2-propanol solution (curve 1). The cell was operated at a current density of 32 mA/$cm^2$. The largest performance increase of ca. 4 mV occurred when the flow rate of 0.5 M 2-propanol was increased from 2.4 to 6.6 ml/min. Afterwards, the performance increase slowed down. A total of 14 mV was observed when the flow rate was increased from 12 to 73 ml/min. At lower flow rates the flow of solution was discontinued. This was considered the major reason for the decrease in the fuel cell performance. In subsequent experiments, the 2-propanol flow rate was set at 38 ml/min, corresponding to a reaction stoichiometry of ca. 220 and 75 for a 1.0 M 2-propanol solution and a 1.0 M methanol solution, respectively, at a current density of 200 mA/cm$^2$. It should be observed that a high liquid flow rate is not a concern in a direct oxidation fuel cell.

Figure 2:
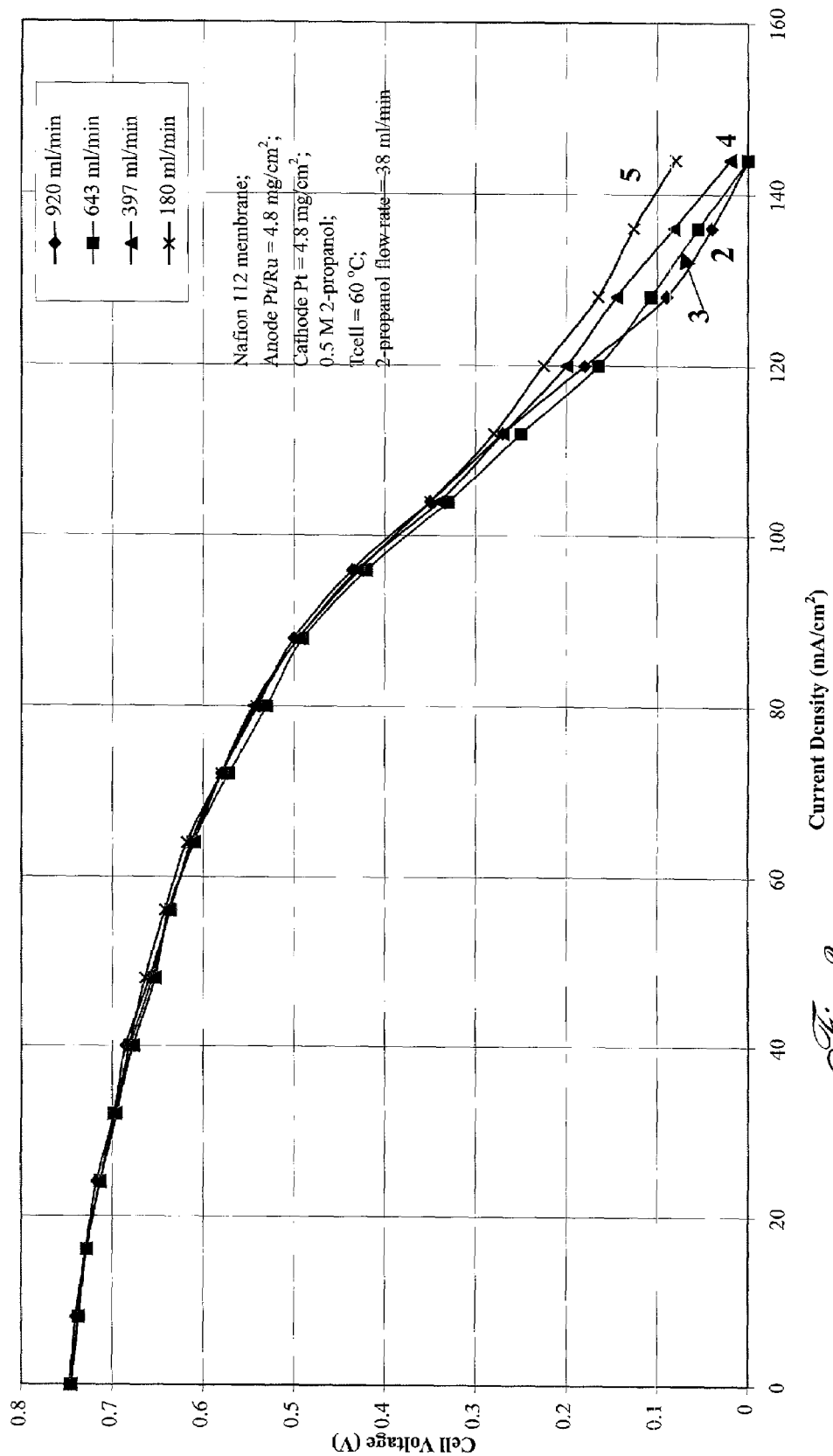
FIG. 2 illustrates a graph depicting the performance of 0.5 M 2-propanol fuel cell with different airflow rates at a cell temperature of 60° C.

Referring to FIG. 2, the graph shows the performances of a 0.5 M 2-propanol solution at a cell temperature of 60° C., with airflow rates at 920 (curve 2), 643 (curve 3), 397 (curve 4), and 180 (curve 5) ml/min, respectively. Airflow rates of 180, 397, 643, and 920 ml/min, correspond to reaction stoichiometries of 2.0, 4.4, 7.1, and 10.2, respectively, at a current density of 200 MA/cm$^2$. In contrast to 2-propanol flow, airflow rates should be controlled as slowly as possible in order to balance the water in the entire fuel cell system and to reduce the parasitic power loss from an air pump or compressor. FIG. 2 indicates airflow rates from 180 to 920 ml/min have little effect on the fuel cell performance (i.e., an airflow rate of 180 ml/min is high enough to achieve the highest fuel cell performance using 0.5 M 2-propanol at 60° C.). The cell voltage only declined gradually at current densities of less than 60 mA/cm$^2$, but it declined much faster at higher current densities. The highest current density reached by the cell was around 140 MA/cm$^2$.

Figure 3:
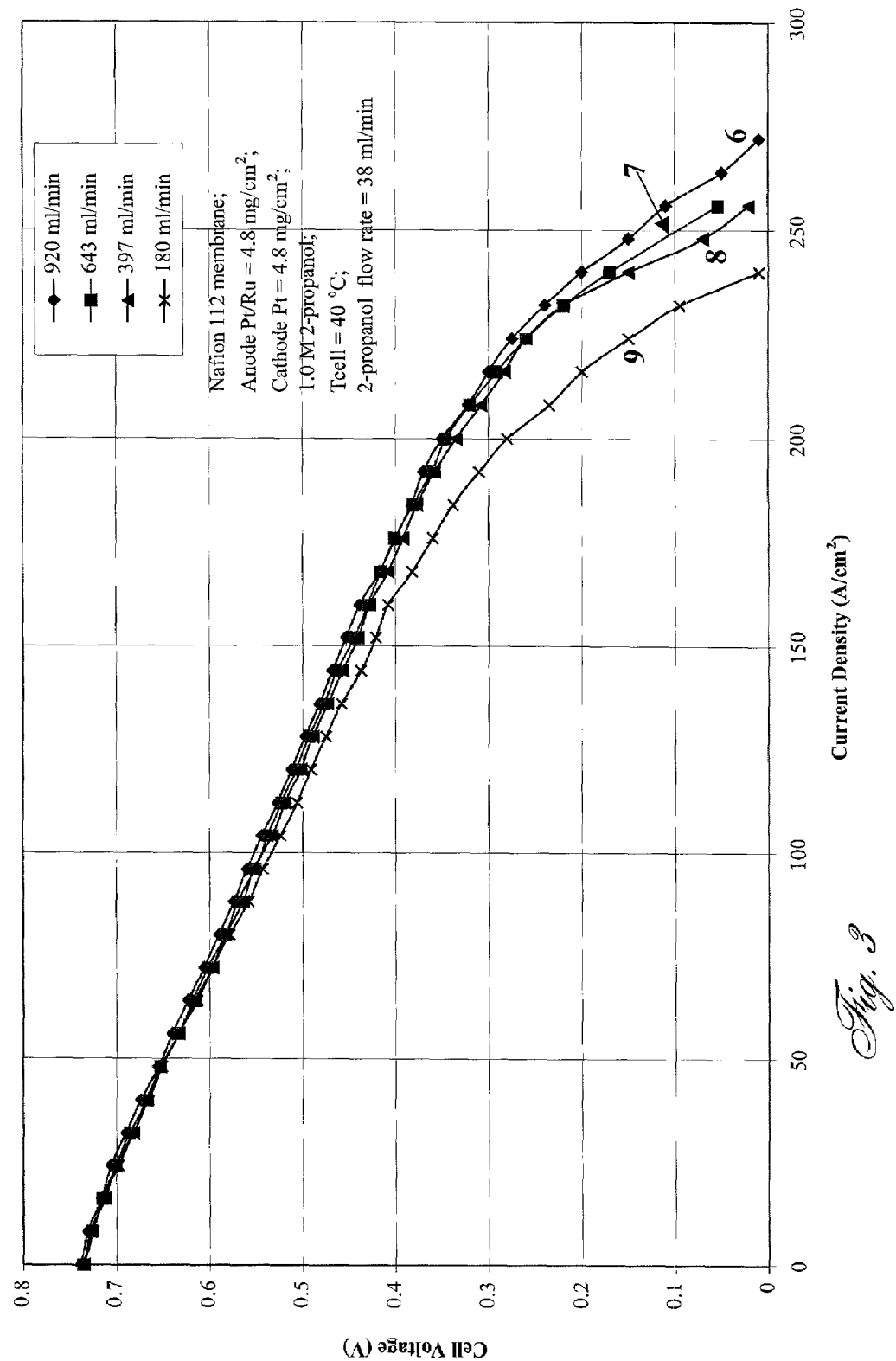
FIG. 3 shows a graph depicting the performances of 1.0 M 2-propanol fuel cell having different airflow rates at a cell temperature of 40° C.

The highest current density of 250 mA/cm$^2$ was achieved when a 1.0 M 2-propanol solution was used, despite a lower cell temperature of 40° C., as shown in FIG. 3. The cell had a slightly lower performance at an airflow of 180 ml/min, (curve 9), compared to other higher airflow rates (curves 6, 7, 8). The cell performance declined gradually at current densities less than 200 mA/cm$^2$. It was observed that a subsequent quick decline occurred. This quick decline seemed to be due to poisoning of the anode by reaction intermediates. Each data point in this region might continue to decline if longer times were observed before the data was recorded. This data was considered as transient, rather than stabilized, data. It was found the poison could be quickly removed by switching the polarity of the anode and cathode.

Figure 4:
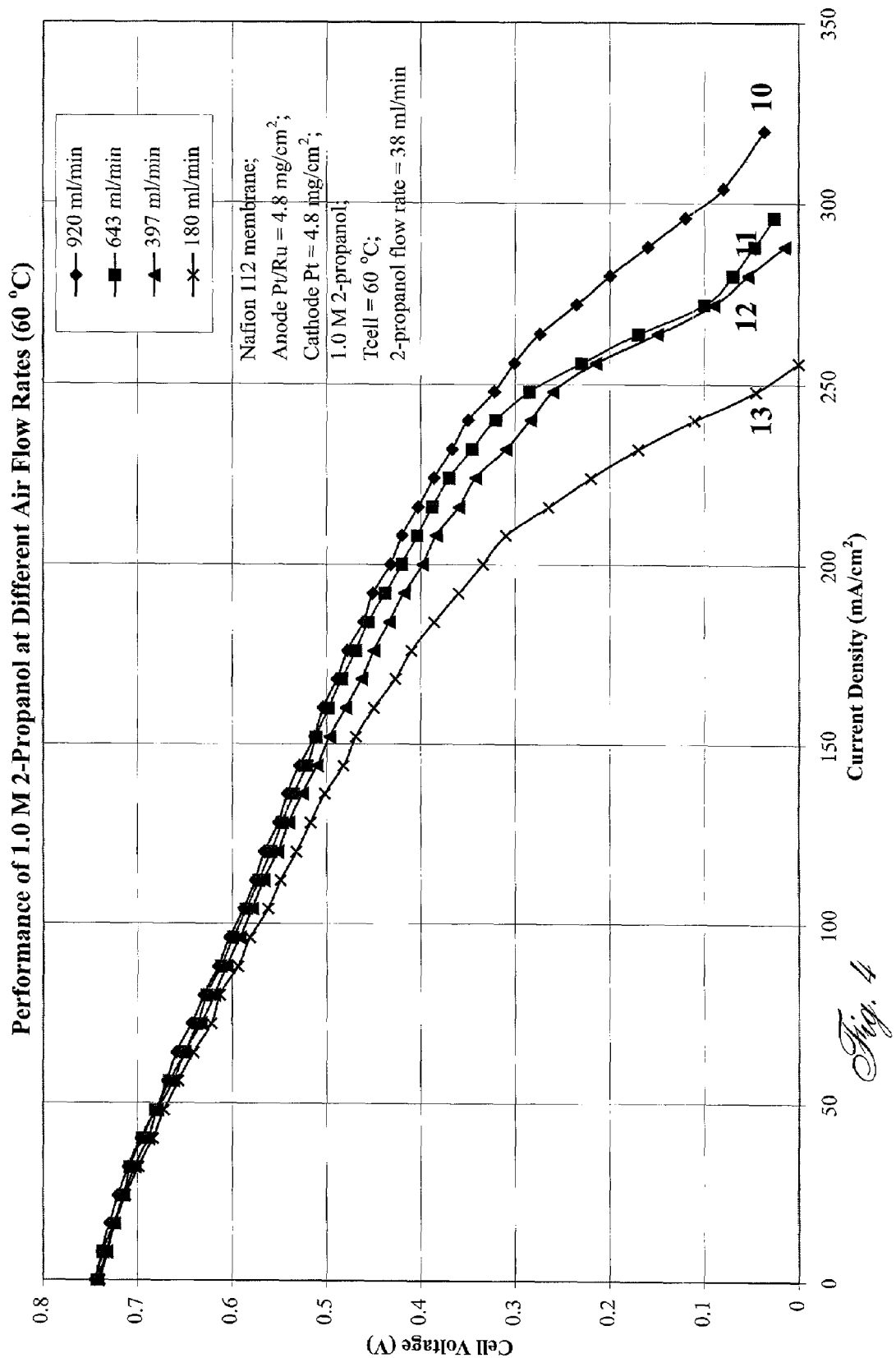
FIG. 4 depicts a graph showing the performances of 1.0 M 2-propanol fuel cell at different airflow rates at a cell temperature of 60° C.

A highest current density of between 250 and 320 mA/cm$^2$ was achieved when the fuel cell temperature was increased from 40° C. to 60° C., as shown in FIG. 4 (curves 10, 11, 12, 13). The trends of the V-I curves were similar to those in FIG. 3 and a quick voltage decline occurred at current densities higher than 200 mA/cm$^2$. In addition, the performances increased gradually with airflow rate.

Figure 5:
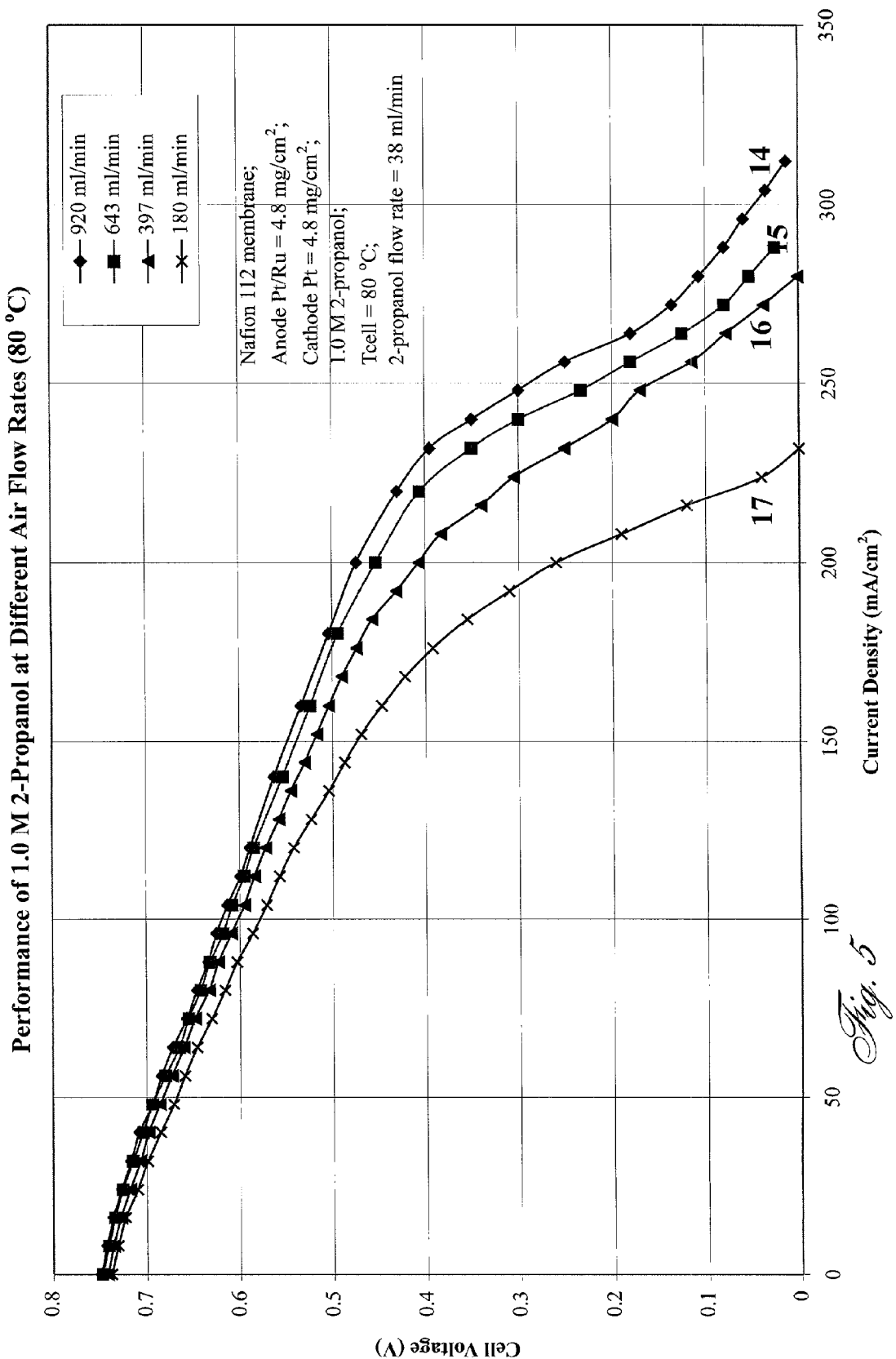
FIG. 5 illustrates a graph of the performances of 1.0 M 2-propanol fuel cell at different airflow rates at a cell temperature of 80° C.

Referring to FIG. 5, the graph shows a fuel cell performance at a temperature of 80° C., (curves 14, 15, 16, 17). The V-I curves were similar to those illustrated in FIG. 4.

Figure 6:
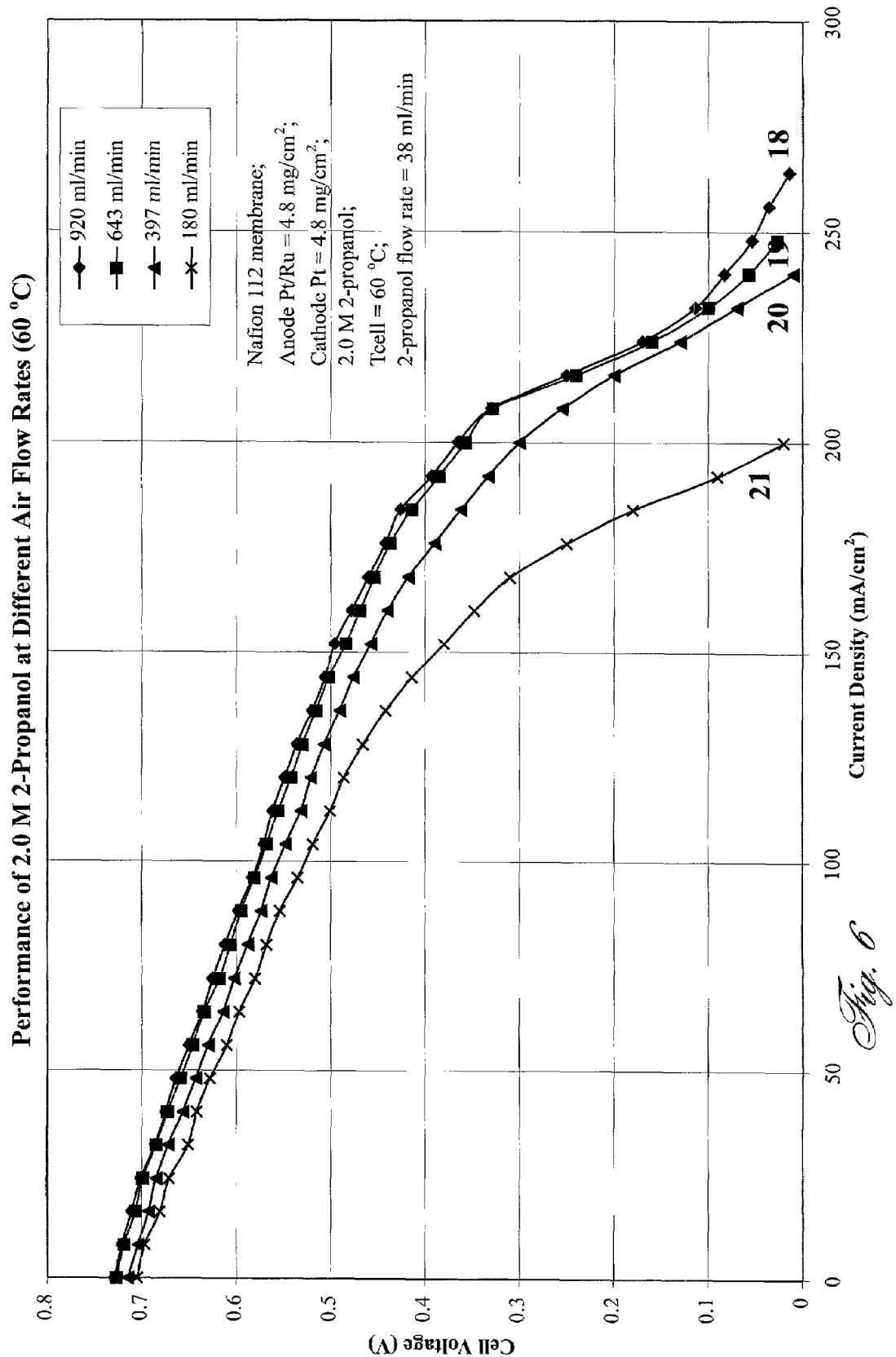
FIG. 6 shows a graph of the performances of 2.0 M 2-propanol fuel cell at different airflow rates at a cell temperature of 60° C.

Referring to FIG. 6, a graph is shown of the performances of 2.0 M 2-propanol solution at a cell temperature of 60° C. with airflow rates ranging from 180 to 920 ml/min (curves 18, 19, 20, 21). The V-I curves were similar to those in FIGS. 4 and 5.

Figure 7:
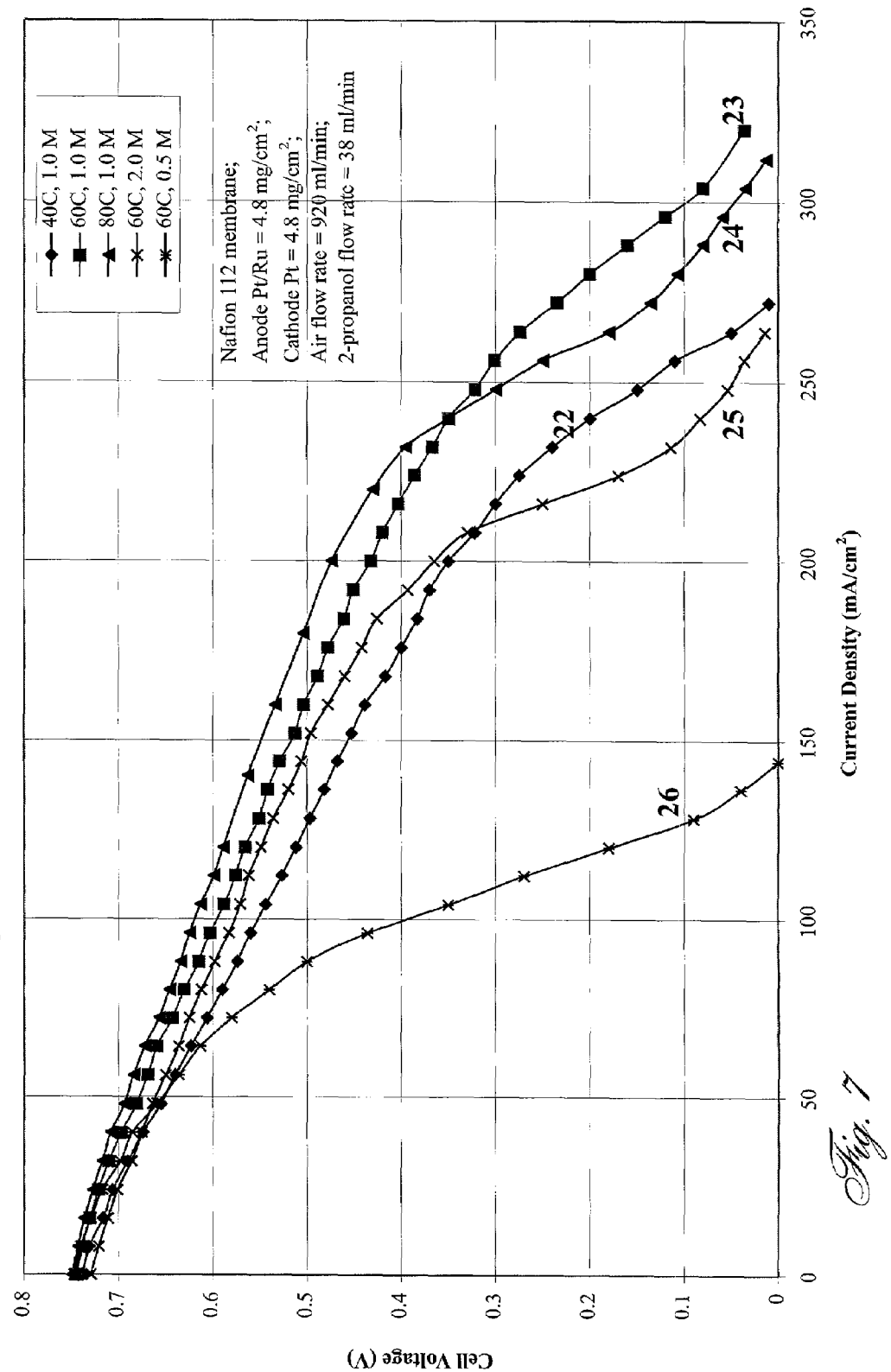
FIG. 7 depicts a graph of the effects of cell temperature and 2-propanol concentration on performance of a fuel cell at an airflow rate of 920 m/min.

Referring to FIG. 7, a graph comparing the performances of a D2 PFC at different cell temperatures and different 2-propanol concentrations at an airflow rate of 920 ml/min is illustrated. At current densities higher than 60 MA/cm$^2$, 0.5 M 2-propanol gave the worst performance (curve 26). Using 1.0 M 2-propanol the cell performance increased as the cell temperature was increased from 40° C. (curve 22) to 60° C. (curve 23), and then to 80° C. (curve 24). At the same cell temperature of 60° C., 1.0 M 2-propanol gave the best performance (curve 23), followed by 2.0 M 2-propanol (curve 25), and then by 0.5 M 2-propanol (curve 26). The lower performance of 2.0 M 2-propanol (curve 25) compared to 1.0 M 2-propanol (curve 23) was believed to be due to higher 2-propanol crossover, as will be hereinafter discussed.

Figure 8:
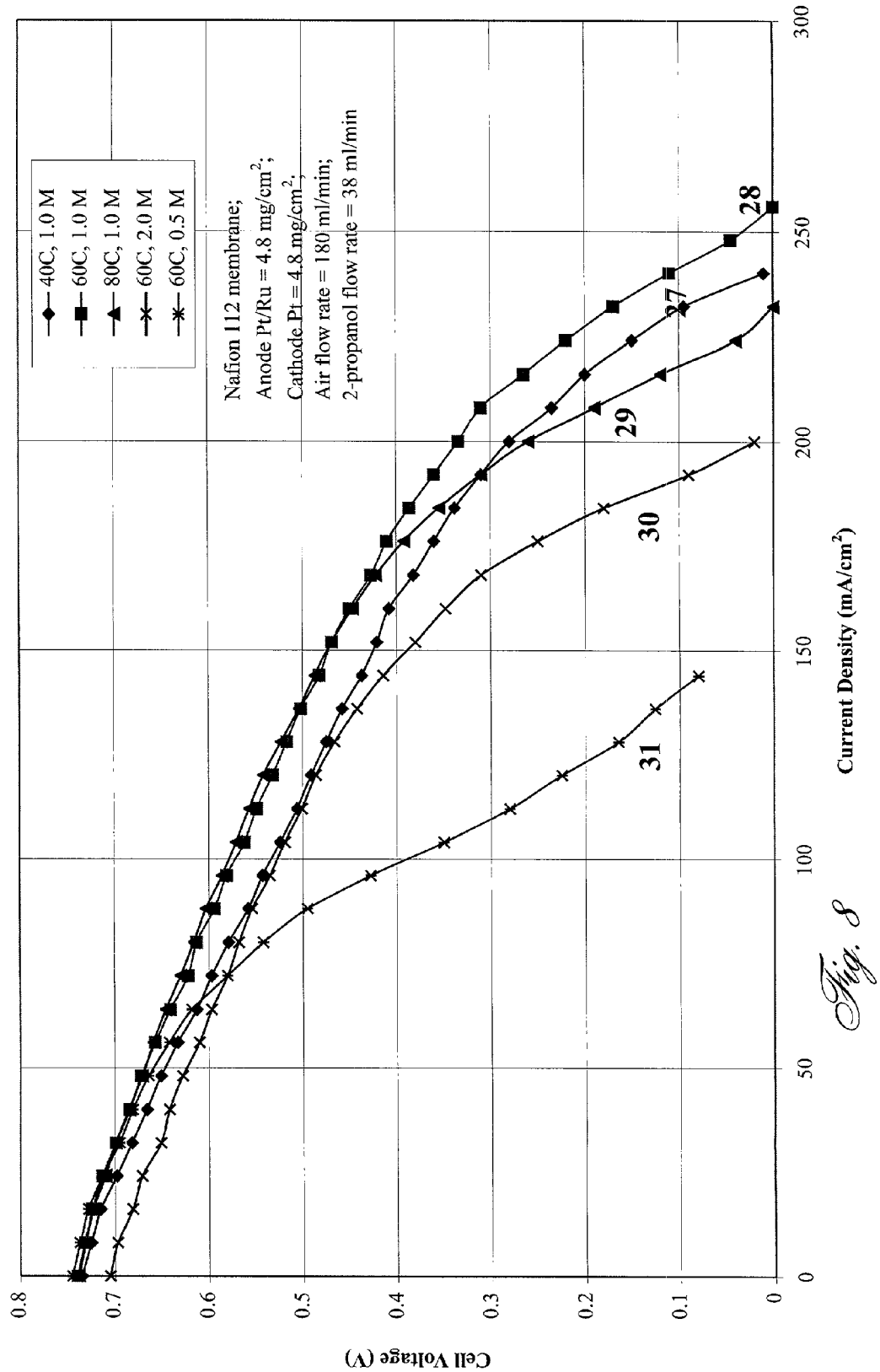
FIG. 8 shows a graph of the effects of cell temperature and 2-propanol concentration on the performance of a fuel cell at an airflow rate of 180 m/min.

Referring to FIG. 8, the graph shows similar experiments to those shown in FIG. 7, but uses a lower airflow rate of 180 ml/min. At current densities higher than 60 MA/cm$^2$, 0.5 M 2-propanol gave the worst performance (curve 31). At current densities lower than 60 MA/cm$^2$, 2.0 M 2-propanol likewise gave a poor performance (curve 30). Using 1.0 M 2-propanol, the cell performance increased as the cell temperature was increased from 40° C. (curve 27) to 60° C. (curve 28). It was observed, however, that there was little change from 60° C. (curve 28) to 80° C. (curve 29). At the same cell temperature of 60° C., 1.0 M 2-propanol gave the best performance (curve 28), followed by 2.0 M 2-propanol (curve 30), and then by 0.5 M 2-propanol (curve 31). The lower performance of 2.0 M 2-propanol (curve 30) compared to both 1.0 M 2-propanol (curve 28) and 0.5 M 2-propanol (curve 31) at current densities less than 60 mA/cm$^2$ was believed to be a result of a higher 2-propanol crossover, as will be explained hereinafter.

Figure 9:
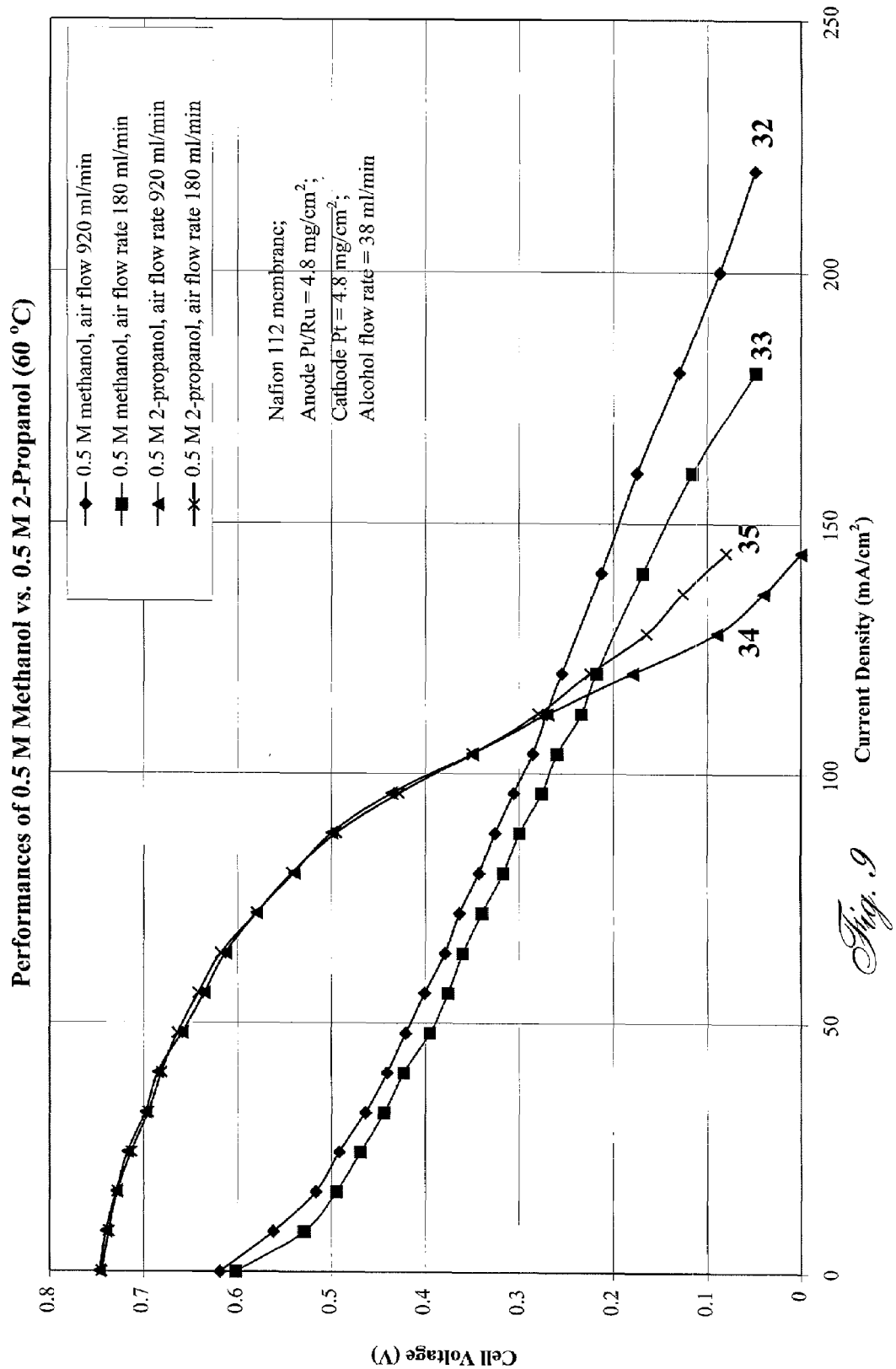
FIG. 9 illustrates a graph of the performances of 0.5 M methanol vs. 0.5 M 2-propanol each at a cell temperature of 60° C.

Referring to FIG. 9, a graph illustrates a comparison of fuel cell performances of 0.5 M 2-propanol vs. 0.5 M methanol, at a cell temperature of 60° C. At current densities less than 100 MA/cm$^2$, 0.5 M 2-propanol (curves 34 and 35) performed much better than 0.5 M methanol (curves 32 and 33). The open circuit voltage of the D2 PFC was ca. 0.14 V higher than that of a DMFC. The D2 PFC showed similar performances at airflow rates of 180 (curve 35) and 920 ml/min (curve 34). For the DMFC, an airflow rate of 920 ml/min (curve 32) gave a slightly higher performance than an airflow rate of 180 ml/min (curve 33).

Figure 10:
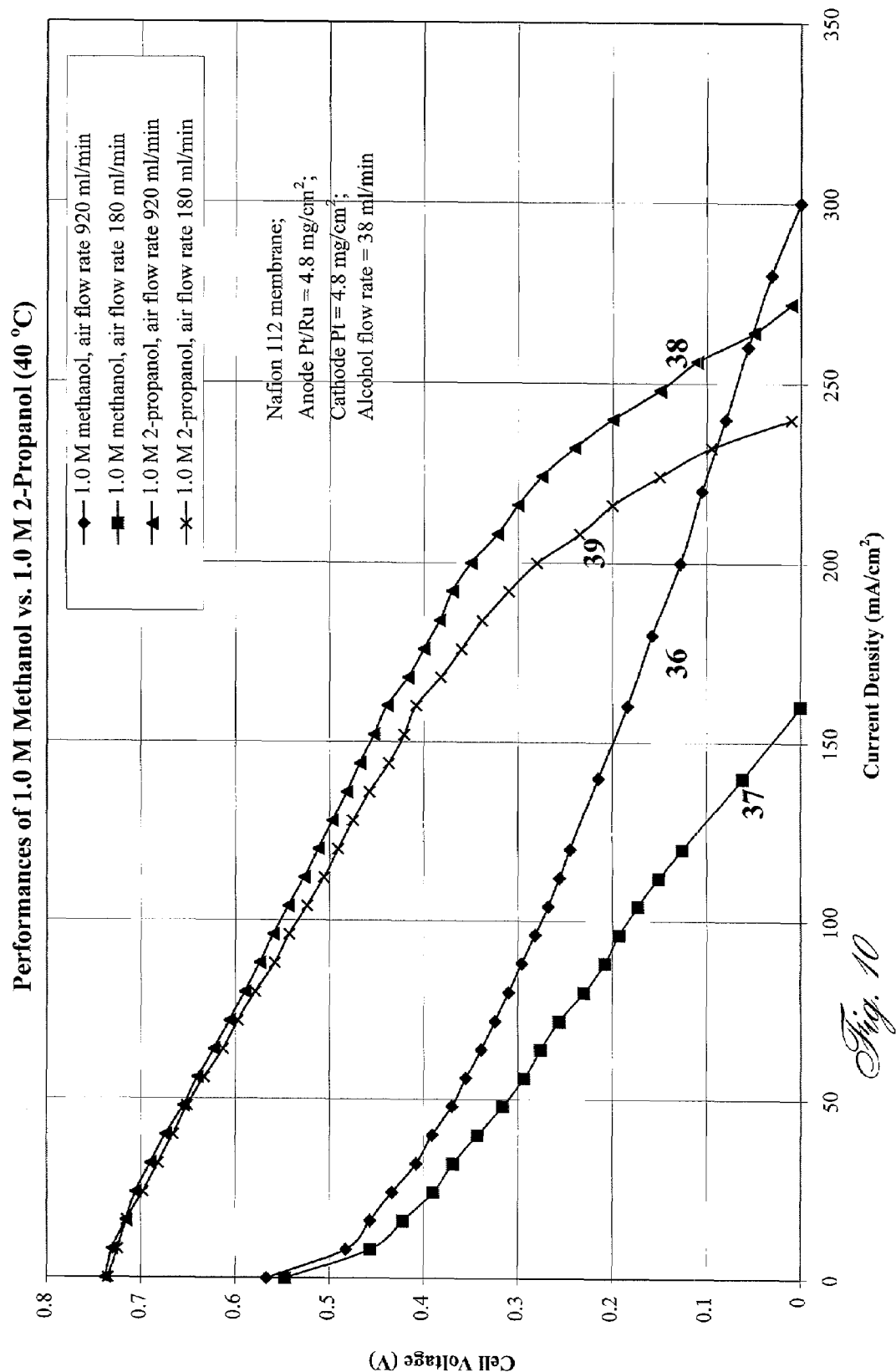
FIG. 10 depicts a graph of the performances of 1.0 M methanol vs. 1.0 M 2-propanol fuel cells, each at a cell temperature of 40° C.

Referring to FIG. 10, a graph comparing fuel cell performances of 1.0 M 2-propanol vs. 1.0 M methanol at a cell temperature of 40° C. is illustrated. At current densities less than 200 mA/cm$^2$, 1.0 M 2-propanol (curves 38 and 39) performed much better than 1.0 M methanol (curves 36 and 37). The open circuit voltage of the D2 PFC was ca. 0.17 V higher than that of the DMFC. The D2 PFC showed slightly better performance at an air flow rate of 920 (curve 38), than at an air flow rate of 180 ml/min, (curve 39) while for the DMFC, an air flow rate of 920 ml/min (curve 36) gave a much higher performance than an airflow rate of 180 ml/min (curve 37).

Figure 11:
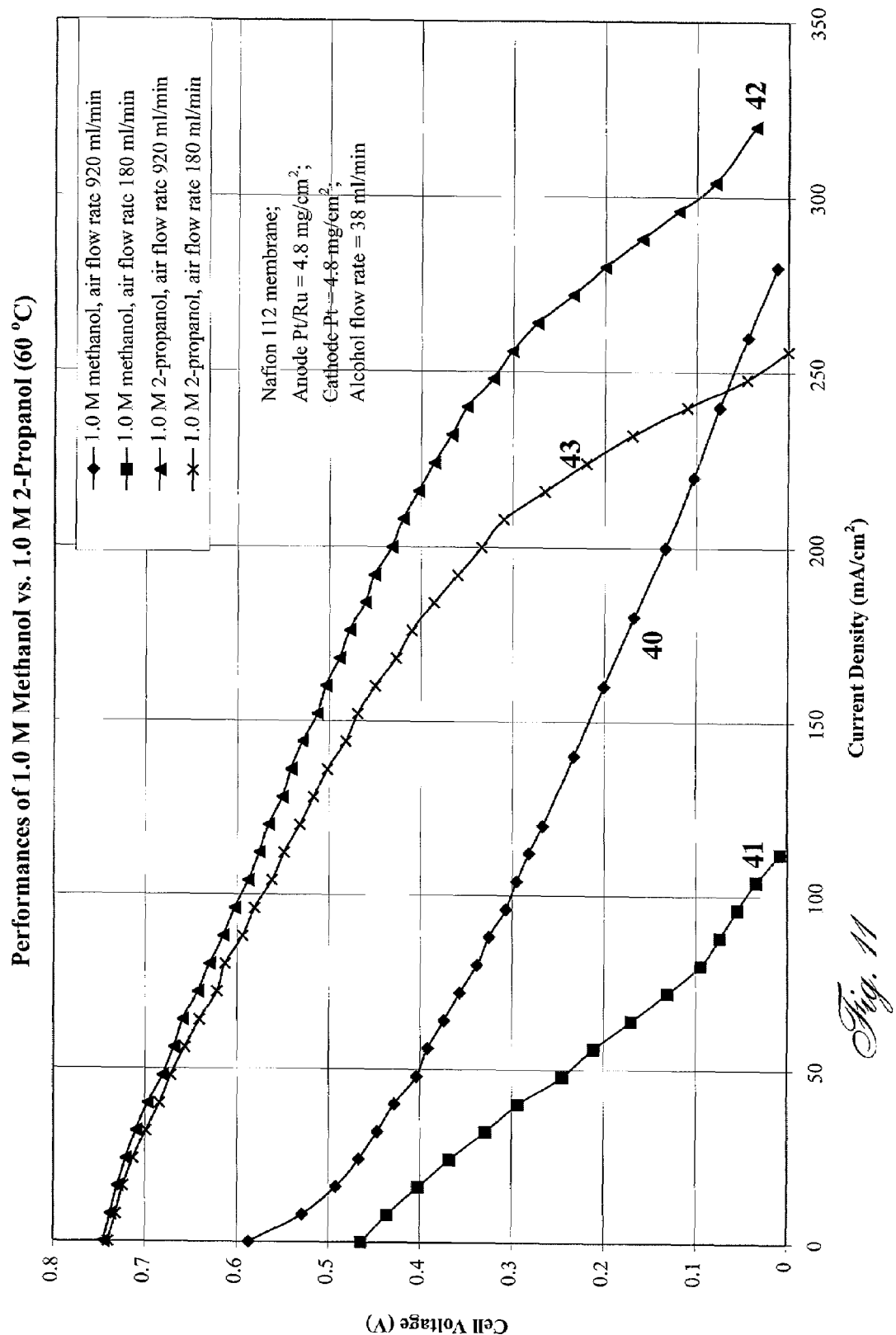
FIG. 11 shows a graph of the performances of 1.0 M methanol vs. 1.0 M 2-propanol fuel cells, each at a cell temperature of 60° C.

Referring to FIG. 11, the graph compares fuel cell performances of 1.0 M 2-propanol vs. 1.0 M methanol at a cell temperature of 60° C. In the entire current density region, 1.0 M 2-propanol (curves 42 and 43) performed much better than 1.0 M methanol (curves 40 and 41). The open circuit voltage of the D2 PFC was respectively ca. 0.16 and 0.29 V higher than that of the DMFC, at respective airflow rates of 920 and 180 ml/min.

The D2 PFC showed slightly better performance at an air flow rate of 920 (curve 42) than at an air flow rate of 180 ml/min (curve 43), while for the DMFC, an airflow rate of 920 ml/min (curve 40) gave a much higher performance than an airflow rate of 180 ml/min (curve 41). The performance of the DMFC at an airflow rate of 180 ml/min was extremely low (curve 41).

Figure 12:
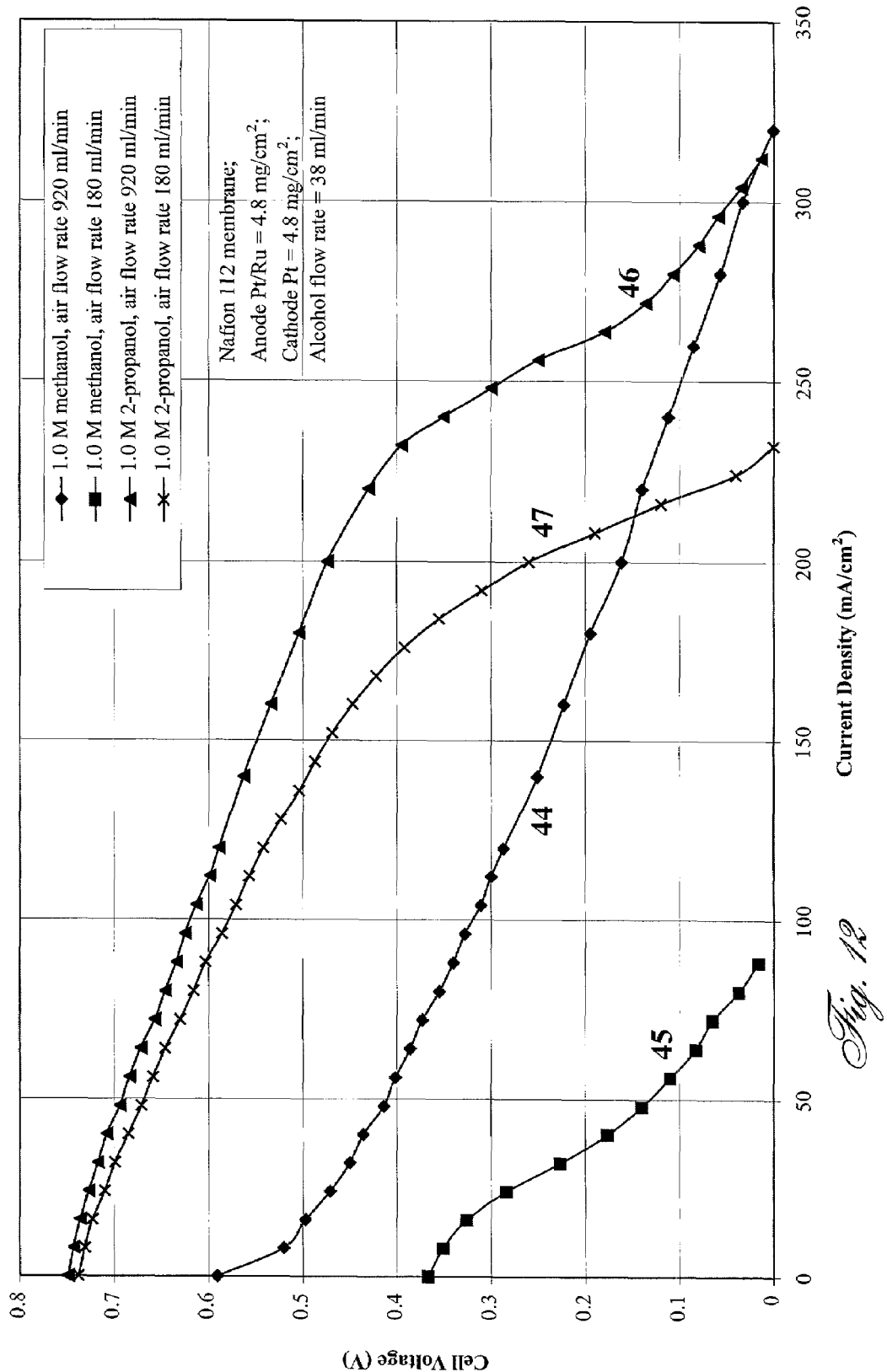
FIG. 12 illustrates a graph depicting the performances of 1.0 M methanol vs. 1.0 M 2-propanol fuel cells, each at a cell temperature of 80° C.

Referring to FIG. 12, the graph compares fuel cell performances of 1.0 M 2-propanol vs. 1.0 M methanol at a cell temperature of 80° C. At current densities less than 250 MA/cm$^2$, 1.0 M 2-propanol (curves 46 and 47) performed much better than 1.0 M methanol (curves 44 and 45). The open circuit voltage of the D2 PFC was respectively ca. 0.16 and 0.38 V, higher than that of the DMFC at airflow rates of 920 and 180 ml/min, respectively. The D2 PFC showed better performance at an airflow rate of 920 (curve 46) than at an airflow rate of 180 ml/min (curve 47). For the DMFC, an airflow rate of 920 ml/min (curve 44) gave a much higher performance than an airflow rate of 180 ml/min (curve 45). The performance of the DMFC at an airflow rate of 180 ml/min was extremely low (curve 45).

Figure 13:
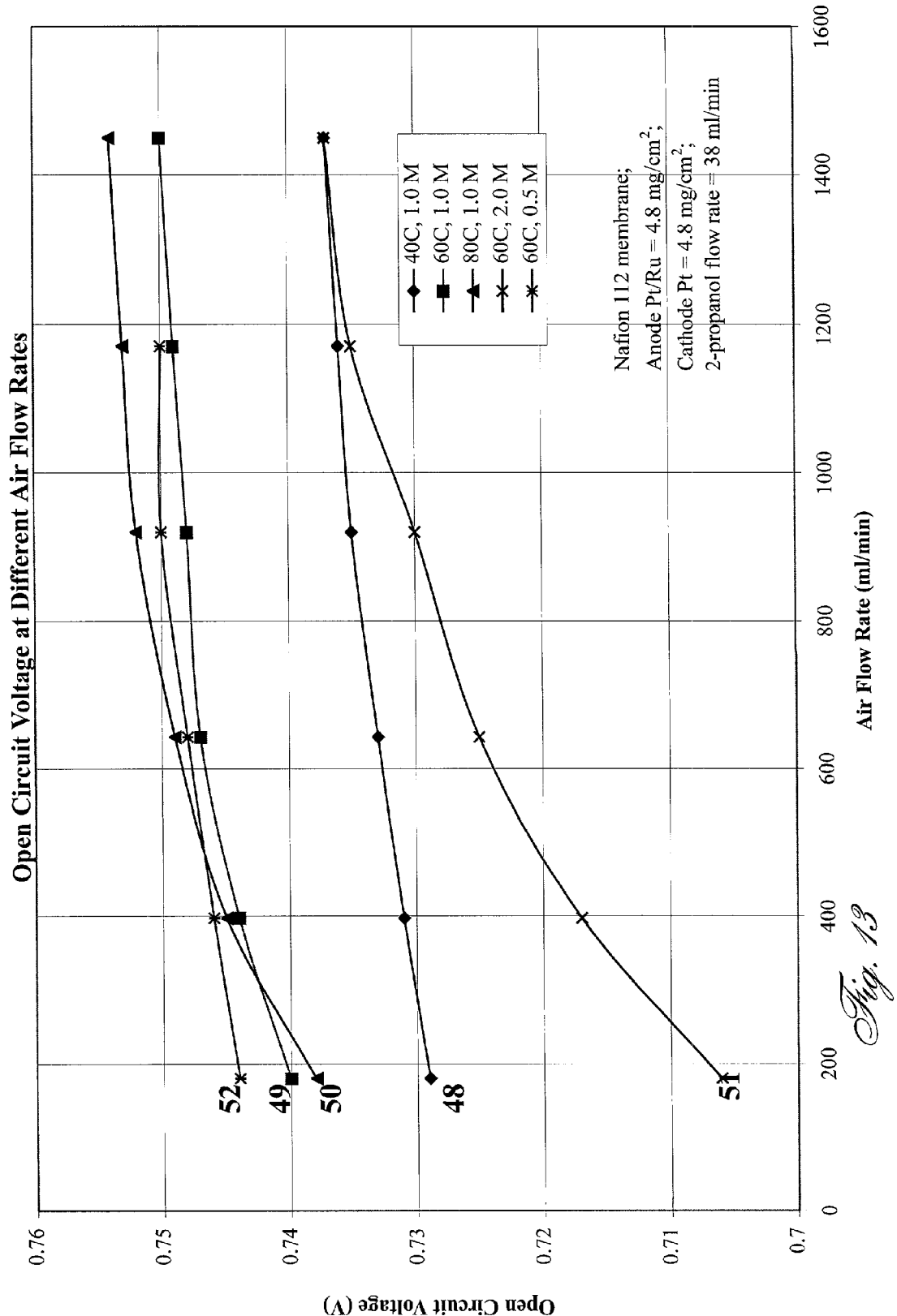
FIG. 13 shows a graph of the open circuit voltage of D2 PFCs at different airflow rates, different cell temperatures, and different 2-propanol concentrations.

Referring to FIG. 13, a graph shows the open circuit voltage (OCV) of a D2 PFC at different airflow rates, different cell temperatures, and different 2-propanol concentrations. The general trend was the OCV declined slightly with a decrease of the airflow rate. The airflow rate had a larger effect on the performance of the cell when either the cell temperature was high (curve 50) or the 2-propanol concentration was high (curve 51). The reason for this was that 2-propanol had a higher crossover rate at higher temperatures and higher concentrations, as will be explained hereinafter.

At the same 2-propanol concentration of 1.0 M, the OCV increased by 10 mV as the cell temperature increased from 40° C. (curve 48) to 60° C. (curve 49), but the increase was less than 4 mV when the cell temperature was further increased from 60° C. (curve 49) to 80° C. (curve 50).

At the same cell temperature of 60° C. the OCV decreased slightly as the 2-propanol concentration was increased from 0.5 M (curve 52) to 1.0 M (curve 49). However, a much larger decrease was observed when the concentration was further increased from 1.0 M (curve 49) to 2.0 M (curve 5L).

At an airflow rate of 180 ml/min. the cell actually had a slightly lower OCV at 80° C. than at 60° C.

Figure 14:
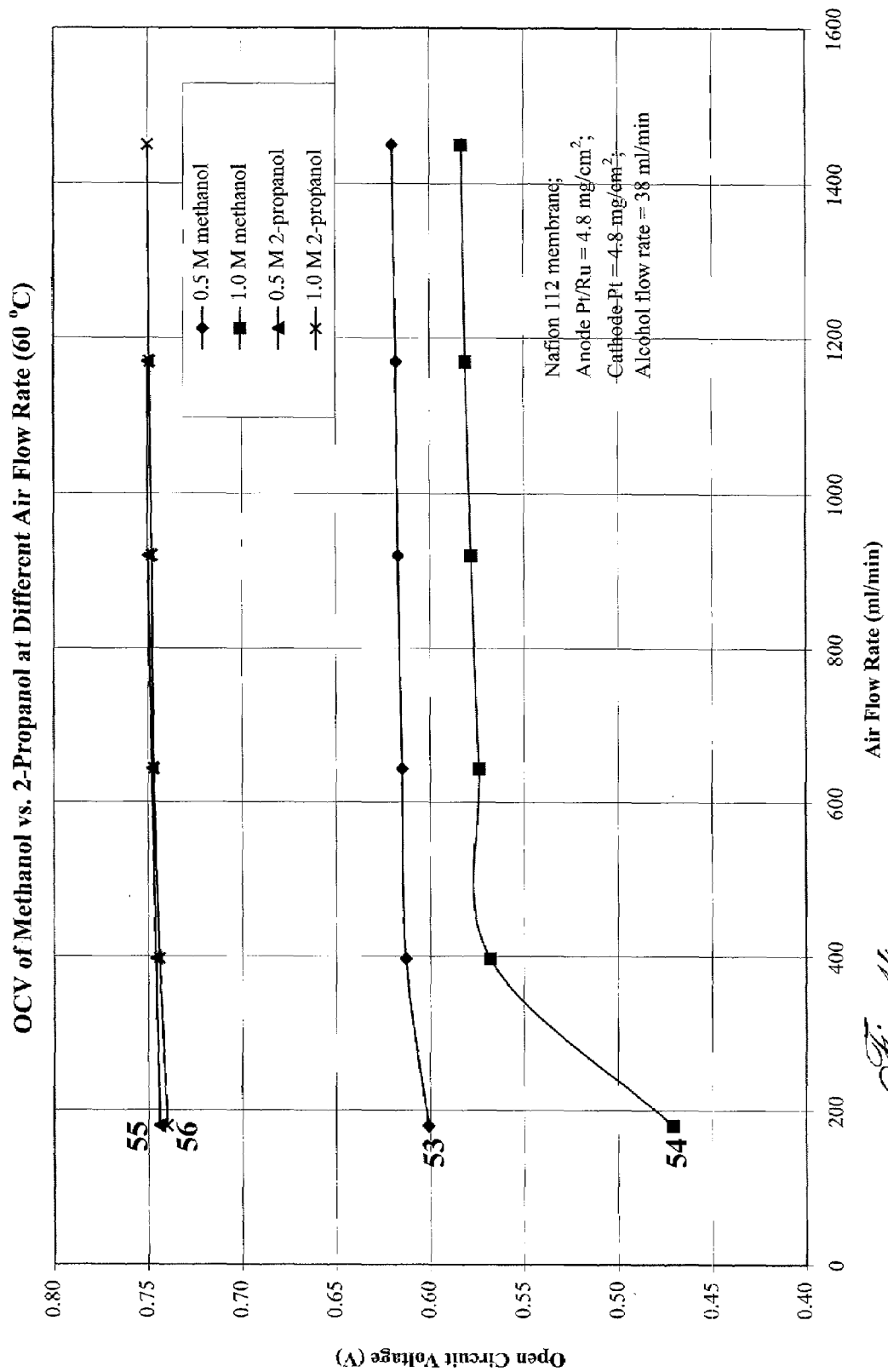
FIG. 14 depicts a graph showing the open circuit voltage of DMFCs vs. D2 PFCs at different airflow rates, at a cell temperature of 60° C.

Referring to FIG. 14, the graph compares the open circuit voltage of methanol vs. 2-propanol at different airflow rates and different alcohol concentrations at a cell temperature of 60° C. The general trends were that the OCV declined with a decrease of the airflow rate and the D2 PFC (curves 55 and 56) had much higher OCV than the DMFC (curves 53 and 54).

Higher alcohol concentration gave a smaller OCV. For the DMFC using 1.0 M methanol solution, its OCV dropped significantly from 0.57 V to 0.47 V when the airflow rate declined from 397 to 180 ml/min (curve 54).

Increasing the methanol concentration from 0.5 M (curve 53) to 1.0 M (curve 54) decreased the OCV of the DMFC as much as 50 mV. In contrast, when 2-propanol concentration was increased from 0.5 M (curve 55) to 1.0 M (curve 56), the OCV of the D2 PFC only declined slightly.

Figure 15:
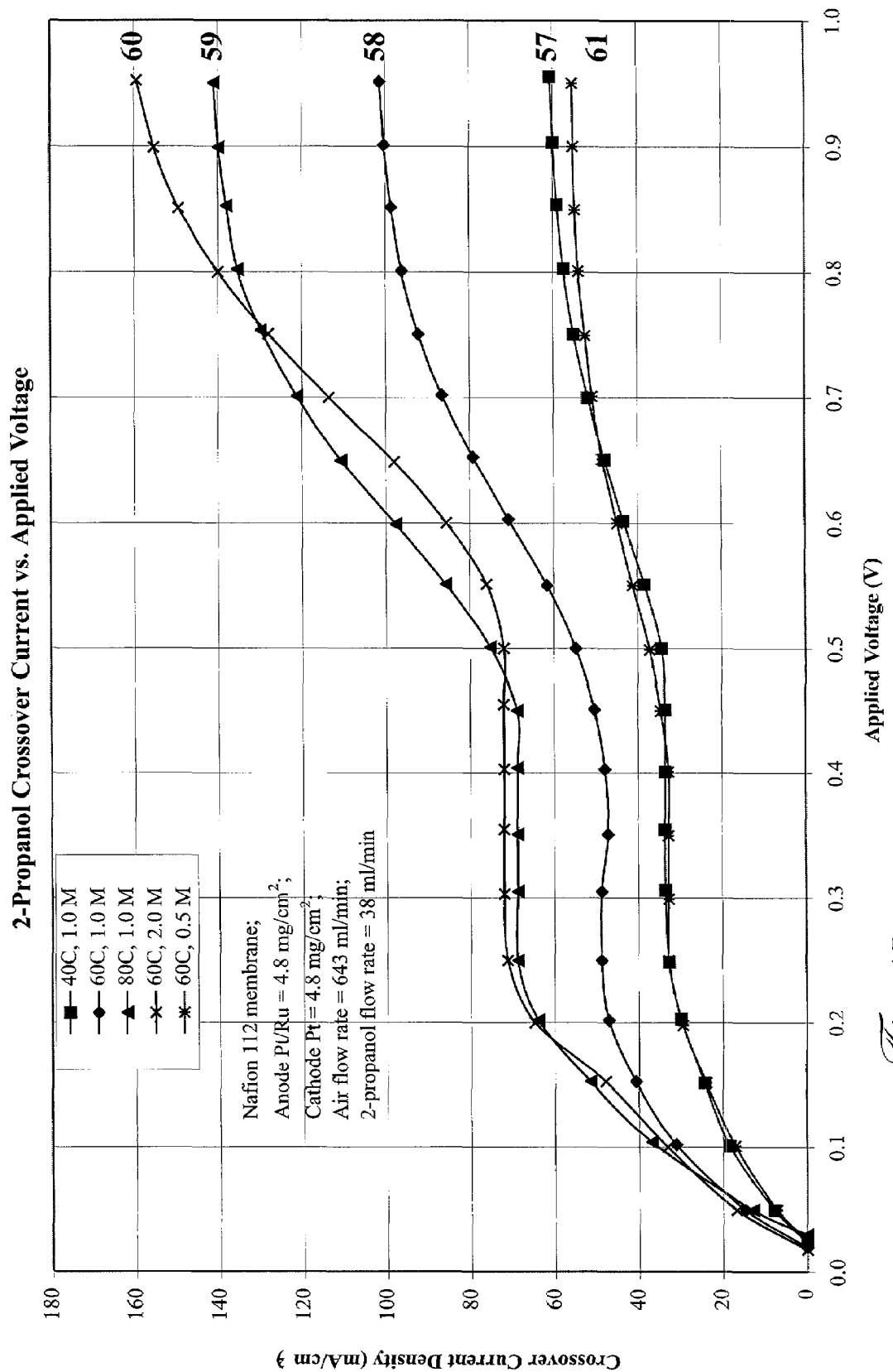
FIG. 15 illustrates a graph of 2-propanol crossover current vs. applied voltage at different cell temperatures and different 2-propanol concentrations.

Referring to FIG. 15, the graph shows 2-propanol crossover current measured electrochemically at different applied voltages. These experiments were performed using nitrogen rather than air that was passed through the cathode compartment of the fuel cell with a positive applied voltage.

As 2-propanol crosses through the membrane to reach the cathode it is oxidized by the applied voltage. The value of the measured current density represents how fast 2-propanol crosses through the membrane. All the curves from 57 through 61 showed four distinct regions: From 0.0 to 0.2 V, the crossover current increased quickly with the applied voltage; from 0.2 to 0.5 V the crossover current stayed flat. From 0.5 to 0.8 V the crossover current increased quickly again. From 0.8 V to 0.95 V the crossover current approached a plateau. The flat region from 0.2 to 0.5 V was found to be due to quick poisoning of the cathode by the oxidation intermediates of 2-propanol. Each data point would go lower if a longer time was observed before the data was recorded.

Platinum was used as the catalyst for the cathode. As the applied voltage went higher than 0.5 V, the catalyst surface seemed to be cleaned by the positive voltage and the currents increased until a mass transport limitation of 2-propanol through the membrane was approached at voltages higher than 0.8 V, and preferably, at a voltage higher than 0.9 V. Therefore, a more accurate crossover current is measured at voltages higher than 0.8 V.

At the same 2-propanol concentration of 1.0 M, the crossover current increased almost linearly as the cell temperature was increased from 40° C. (curve 57) to 60° C. (curve 58) and then to 80° C. (curve 59). At the same cell temperature of 60° C. the crossover current increased significantly from 0.5 M 2-propanol (curve 61) to 1.0 M (curve 58) and then to 2.0 M (curve 60).

Figure 16:
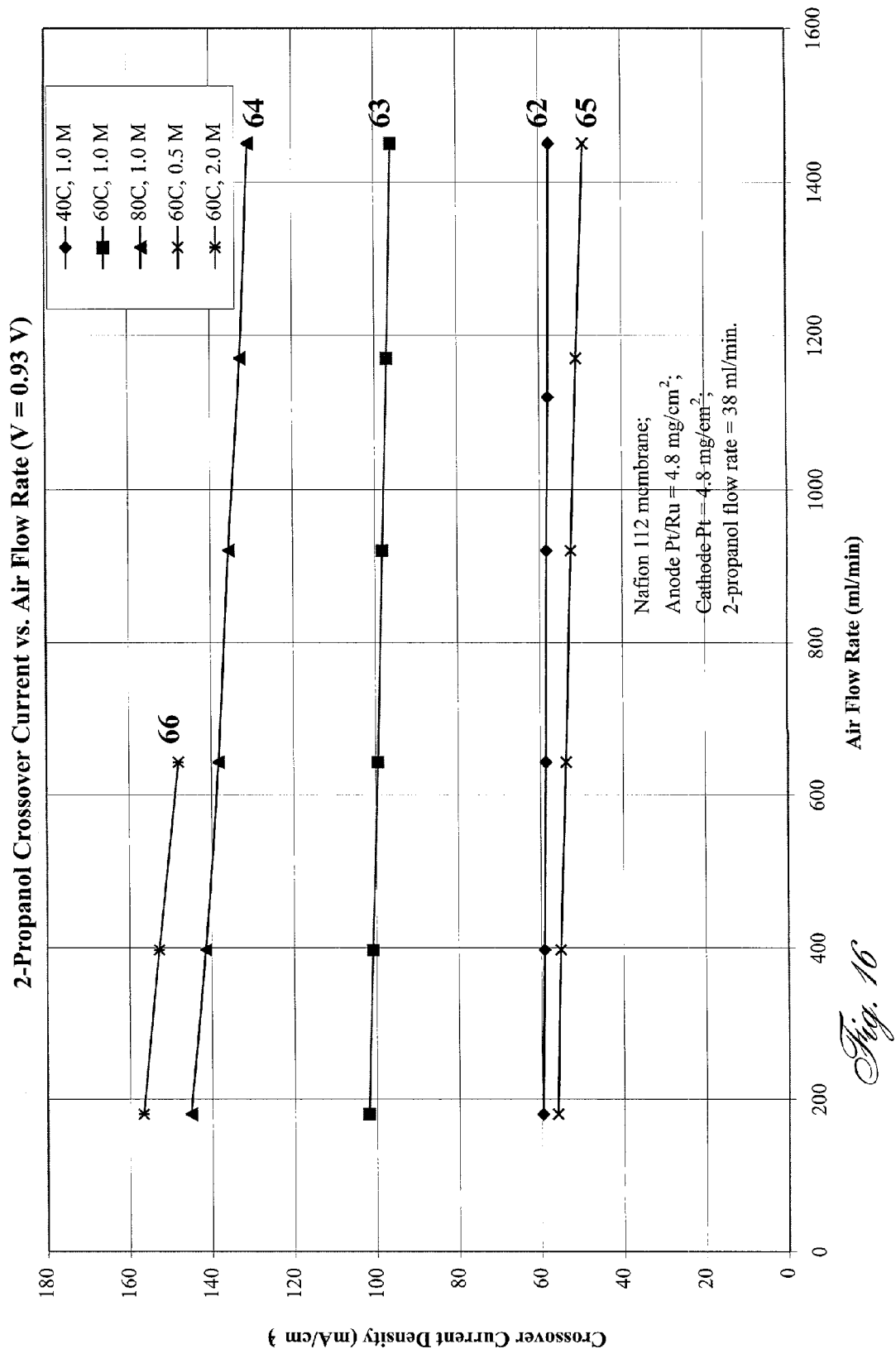
FIG. 16 shows a graph of 2-propanol crossover current vs. airflow rate at an applied voltage of 0.93 V.

Referring to FIG. 16, the graph shows 2-propanol crossover currents at an applied voltage of 0.93 V at different airflow rates, different cell temperatures, and different 2-propanol concentrations. The general trend was the crossover current declined slightly as the airflow rate increased. At the same 2-propanol concentration of 1.0 M, the crossover current increased almost linearly as the cell temperature was increased from 40° C. (curve 62) to 60° C. (curve 63), and then to 80° C. (curve 64).

At the same cell temperature of 60° C., the crossover current increased significantly from 0.5 M 2-propanol (curve 65) to 1.0 M (curve 63), and then to 2.0 M (curve 66).

Referring to FIG. 17, a comparison is shown for the crossover currents of methanol vs. 2-propanol at a cell temperature of 60° C. In contrast to 2-propanol, methanol showed little crossover current at applied voltages less than 0.3 V. This did not mean there was no methanol crossing through the membrane, but rather that methanol could not be oxidized at voltages less than 0.3 V. Methanol crossover current increased quickly when voltages were increased beyond 0.3 V. The crossover current approached a plateau, over 0.8 V. A more accurate methanol crossover current should be measured at voltages higher than 0.8 V and, preferably, higher than 0.9 V. Clearly, methanol crossover currents (curves 67 and 68) were more than double those of 2-propanol (curves 69 and 70) at the same concentrations.

Referring to FIG. 18, a comparison of the crossover currents of methanol vs. 2-propanol at a cell temperature of 60° C., under different airflow rates, is illustrated. The general trend shows a crossover current that declined slightly as the airflow rate increased. More importantly, methanol crossover currents (curves 71 and 72) were more than double those of 2-propanol (curves 73 and 74) at the same concentrations.

Some of the above experimental results are summarized in Table 1 and Table 2, below.

TABLE 1

| Performance of a D2PFC vs. a DMFC* | | | | |
|---|---|---|---|---|
| Cell Temp. (° C.) | 40 | 60 | | 80 |
| Alcohol Conc. (M) | 1.0 | 0.5 | 1.0 | 2.0 | 1.0 |
| Cell Voltage (V) at following current densities (mA/cm$^2$) | | | | |

TABLE 1-continued

Performance of a D2PFC vs. a DMFC*

| Cell Temp. (° C.) | | 40 | 60 | | | 80 |
|---|---|---|---|---|---|---|
| Alcohol Conc. (M) | | 1.0 | 0.5 | 1.0 | 2.0 | 1.0 |
| 48 | 2-Propanol | 0.653 | 0.653 | 0.679 | 0.643 | 0.686 |
|  | Methanol | 0.352 | 0.418 | 0.349 | NM | 0.317 |
| 104 | 2-Propanol | 0.533 | 0.340 | 0.579 | 0.548 | 0.595 |
|  | Methanol | 0.234 | 0.289 | 0.202 | NM | 0.136 |
| 144 | 2-Propanol | 0.457 | 0.020 | 0.510 | 0.476 | 0.530 |
|  | Methanol | 0.160 | 0.200 | 0.097 | NM | 0.052 |
| 200 | 2-Propanol | 0.335 | CNBM | 0.398 | 0.300 | 0.407 |
|  | Methanol | 0.064 | 0.091 | CNBM | NM | CNBM |

*The data were taken at an airflow rate of 397 ml/min;
NM: Not measured; CNBM: Cannot be measured.

TABLE 2

OCV and Alcohol Crossover Current Density in a D2PFC and a DMFC**

| Cell Temp. (° C.) | | 40 | 60 | | | 80 |
|---|---|---|---|---|---|---|
| Alcohol Conc. (M) | | 1.0 | 0.5 | 1.0 | 2.0 | 1.0 |
| $J_{crossover}$ | 2-Propanol | 58.7 | 53.8 | 99.5 | 148.0 | 138.3 |
| (mA/cm$^2$) | Methanol | NM | 153.2 | 254.4 | NM | NM |
| OCV (V) | 2-Propanol | 0.733 | 0.748 | 0.747 | 0.725 | 0.749 |
|  | Methanol | 0.562 | 0.615 | 0.574 | NM | 0.583 |

**The data were taken at an airflow rate of 643 ml/min;
NM: Not measured.

Equations (1) and (2) show the oxidation reactions of methanol and 2-propanol, assuming complete reactions to form $CO_2$ as the final product:

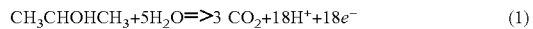

$$CH_3CHOHCH_3 + 5H_2O \Rightarrow 3\ CO_2 + 18H^+ + 18e^- \quad (1)$$

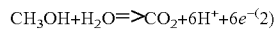

$$CH_3OH + H_2O \Rightarrow CO_2 + 6H^+ + 6e^- \quad (2)$$

For each methanol molecule, 6 electrons are produced, while for each 2-propanol molecule, 18 electrons are produced. In other words, for a complete oxidation of each 2-propanol molecule, three times as large a current should be observed compared to a complete oxidation of each methanol molecule. Therefore, the amount of 2-propanol crossing through the membrane is less than one-sixth that of methanol based on the crossover currents shown in FIGS. 15 and 16. This reduced 2-propanol crossover should greatly increase both fuel and fuel cell efficiencies.

Another advantage of 2-propanol over methanol is its higher electrochemical energy density. 2-propanol has a similar density as methanol (0.785 vs. 0.791 g/cm$^3$) and the molecular mass of 2-propanol (60.10 g/mol) is less than double that of methanol (32.04 g/mol). The complete oxidation of one 2-propanol molecule produces three times as much electrons as one methanol molecule and the electrochemical energy density of 2-propanol is more than 1.5 times that of methanol, at per unit volume or mass.

Still another advantage of 2-propanol over methanol is its lower toxicity. Handling 2-propanol is much safer than handling methanol. Furthermore, 2-propanol gives off a strong smell, so any leakage of 2-propanol can be detected immediately.

Still another advantage of 2-propanol over methanol is its lower activation voltage. Based on the data in FIG. 17, the activation overpotential of 2-propanol is less than 0.04 V, but that of methanol is larger than 0.30 V. This will also translate to higher fuel cell efficiency.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A direct oxidation electrochemical fuel cell comprising a stack of electrode and membrane elements, said direct oxidation electrochemical fuel cell producing electrical current through the oxidation of a fuel selected from the group: butanone ($CH_3CH_2COCH_3$), and pentanone ($CH_3COCH_2CH_2CH_3$).

2. The electrochemical fuel cell according to claim 1, wherein the fuel cell is selected from a group of fuel cells consisting of a liquid electrolyte fuel cell, a solid membrane fuel cell, an alkaline fuel cell, a phosphoric acid fuel cell, a molten carbonate fuel cell, and a solid oxide fuel cell.

3. The solid membrane fuel cell according to claim 2, wherein the membrane includes any cationic and anionic membrane.

4. The solid membrane fuel cell according to claim 2, wherein the membrane includes a membrane element selected from a group consisting of: non-fluorinated, partially fluorinated, and perfluorinated membranes.

5. The solid membrane fuel cell according to claim 2, wherein the membrane is a proton exchange membrane.

6. A direct oxidation electrochemical fuel cell comprising a stack of electrode and membrane elements, said direct oxidation electrochemical fuel cell producing electrical current through the oxidation of a secondary alcohol comprising glyceraldehyde ($CH_2OHCHOHCOH$).

7. The electrochemical fuel cell according to claim 6, wherein the fuel cell is selected from a group of fuel cells consisting of a liquid electrolyte fuel cell, a solid membrane fuel cell, an alkaline fuel cell, a phosphoric acid fuel cell, a molten carbonate fuel cell, and a solid oxide fuel cell.

8. The solid membrane fuel cell according to claim 7, wherein the membrane includes any cationic and anionic membrane.

9. The solid membrane fuel cell according to claim 6, wherein the membrane includes a membrane element selected from a group consisting of: non-fluorinated, partially fluorinated, and perfluorinated membranes.

10. The solid membrane fuel cell according to claim 6, wherein the membrane is a proton exchange membrane.

* * * * *